United States Patent [19]

Kern

[11] Patent Number: 4,531,862
[45] Date of Patent: * Jul. 30, 1985

[54] MANIFOLD TO UNIFORMLY DISTRIBUTE A SOLID-LIQUID SLURRY

[75] Inventor: Kenneth C. Kern, Lake Hiawatha, N.J.

[73] Assignee: Exxon Research and Engineering Co., Florham Park, N.J.

[*] Notice: The portion of the term of this patent subsequent to Nov. 8, 2000 has been disclaimed.

[21] Appl. No.: 493,772

[22] Filed: May 12, 1983

Related U.S. Application Data

[62] Division of Ser. No. 285,003, Jul. 20, 1981, Pat. No. 4,413,934.

[51] Int. Cl.³ ............................................. B65G 53/52
[52] U.S. Cl. .................................. 406/155; 406/106; 406/181; 406/195; 285/177; 239/455
[58] Field of Search ............... 406/155, 156, 195, 197, 406/106, 181; 138/177–178; 285/31, 177, 189

[56] References Cited

U.S. PATENT DOCUMENTS 1,541,903  6/1925  Crites .................................. 406/106
4,305,688 12/1981  Savins ................................. 406/197

Primary Examiner—Jeffrey V. Nase
Assistant Examiner—L. E. Williams

[57] ABSTRACT

This invention features a manifold that divides a stream of coal particles and liquid into several smaller streams maintaining equal or nearly equal mass compositions. The manifold consists of a horizontal, variable area header having sharp-edged, right-angled take-offs which are oriented on the bottom of the header.

2 Claims, 6 Drawing Figures

MANIFOLD TO UNIFORMLY DISTRIBUTE A SOLID-LIQUID SLURRY

This is a division of application Ser. No. 285,003, filed July 20, 1981, now U.S. Pat. No. 4,413,934.

FIELD OF THE INVENTION

This invention relates to the uniform distribution of a solid-liquid suspension into smaller streams, each of which have approximately the same mass compositions, and more particularly to a variable distribution manifold for dividing a main stream comprising a coal slurry into a number of smaller, but essentially equal, streams of substantially uniform content.

BACKGROUND OF THE INVENTION

Synthetic fuels processing is a relatively new art. As such, many new and unusual problems have arisen, one of which is the design and fabrication of uniformly distributing manifolds. These manifolds can be used in any place where a large slurry stream must be divided into smaller streams such as before a bank of pumps, heat exchangers or in the passes of a multi-pass furnace. The manifold is particularly used to feed a multi-pass furnace with uniform injection into each pass. The Government of the United States of America has rights in this invention pursuant to cooperative agreement No. DE-FC01-77EET10069 (formerly agreement No. EF-77-A-01-2893) awarded by the U.S. Energy Research and Development Administration, now the U.S. Department of Energy.

The donor solvent coal liquefaction process, in which these manifolds are used, produces low sulfur liquid products from bituminous, subbituminous, and other types of coal.

A coal preparation section receives feed coal and crushes it to the desired coal particle size for the liquefaction reaction. A slurry drying section mixes the crushed coal with a hydrogenated recycle solvent stream to form the slurry feed to a liquefaction section. Mixing takes place at approximately 250° F. and moisture that enters with the feed coal is vaporized.

In the liquefaction section, the crushed and dried coal is liquefied in a non-catalytic tubular reactor in the presence of molecular H2 and the hydrogen donor solvent which was added to the slurry dryer. Reactor operating conditions are approximately 840° F. and 1920 psig.

Effluent from the liquefaction reactor is separated by distillation in a product recovery section into gas, naphtha, distillates, and a vacuum bottoms slurry. A portion of the distillates serve as feed to a solvent hydrogenation section. In the solvent hydrogenation section, the solvent is catalytically hydrogenated before being recycled for slurrying with the feed coal. The hydrogen donor solvent is a nominal 400°/700° F. boiling range material fractionated from the middle boiling range of the hydrogenated liquid product.

The liquefaction reaction section is comprised of a preheat furnace that heats a mixture of feed from the slurry drier and treat gas, the reactors and a separator vessel. A mixture of coal and solvent is pumped to a high pressure level required for the reactors. Hydrogen rich treat gas is mixed with the feed and both pass through the preheat furnace before entering the reactors. Reactor product then enters the separator drum where lighter material is removed in vapor form overhead and heavier liquids exit via drum bottoms. Heavy intermediate product is sent to fractionation facilities for separation into distillates.

The manifold of this invention feeds the multipass preheat furnace of the liquefaction reaction section, mentioned above. It is necessary to uniformly distribute the coal slurry into each pass of the furnace. However, because the coal slurry is a mixture of coal particles suspended in a hydrocarbon liquid, the ability to uniformly distribute this suspension into each pass is a highly complex task.

The underlying mechanism governing the distribution of the coal at each manifold take-off is a complex combination of inertial, drag, and settling forces which are unique to a given geometry. A potential maldistribution can result from either overall coal concentration differences or particle size distribution variations between passes or a combination of both. Concentration maldistribution resulting from a net inertial or gravitational separation of the coal from the solvent at a manifold take-off point produces variations in the mass fraction of solids between passes. Particle size maldistribution resulting from differences in the balance of forces affecting the large compared to the small particles in the slurry can produce a different coal particle size distribution in each of the manifold passes. Either form of maldistribution will produce significant variations in the overall properties which characterize the slurry flowing in each pass. For example, the pass receiving the higher concentration slurry will have a higher potential for coking and will limit furnace run length. The deviation in properties from design conditions can seriously compromise furnace operability.

Because of the additional complexities of coal/solvent flow dynamics, manifolds for slurry service cannot be designed using the same considerations as for single phase flow. The geometric variables expected to influence slurry distribution include the following:

(a) distribution area—constant or variable
(b) orientation of branch take-off—bottom or side
(c) roundness at branch corner—sharp or smooth The complexity of the flow at a manifold take-off does not allow a prior judgement of the best combination of these characteristics.

DISCUSSION OF RELATED ART

The unique suspension solid particles in a liquid, which the present coal slurry represents, requires a new distribution manifold design. For this reason, it is believed that the manifold of this invention is unrelated to any other similar manifold, and is completely new within the art.

BRIEF SUMMARY OF THE INVENTION

This invention pertains to a manifold having a variable area, for distributing a solid-liquid slurry suspension. The manifold has sharp-edged, bottom-oriented distributor conduits extending from a main conduit. The manifold will uniformly distribute the solid-liquid slurry suspension to each of the distributor conduits.

More particularly, the manifold of this invention is designed to uniformly distribute a coal slurry of coal particles suspended in a hydrocarbon liquid. However, the manifold design may find application elsewhere.

The main conduit of the manifold decreases in cross-sectional area in convergent sections downstream of each distributor conduit. The distributor conduits are generally welded to the main conduit. The distributor conduits are sized so as to maintain substantially constant velocity in the distributor and main conduits, i.e., the linear slurry velocity in the distributor conduits are substantially the same as the linear slurry velocity in the main conduit.

It is an object of this invention to provide an improved manifold for distributing a solid-liquid suspension;

It is another object of the invention to provide a manifold that will uniformly distribute a coal slurry.

These and other objects of the invention will be better understood and will become more apparent with reference to the following detailed description considered in conjunction with the accompanying drawings.

BRIEF DESCRIPTION OF THE DRAWINGS

FIG. 1a is a sectional view of a typical distributor conduit extension from the main conduit of the manifold in FIG. 1;

DETAILED DESCRIPTION OF THE INVENTION

Generally speaking, the invention is for a manifold which uniformly distributes a solid-liquid suspension to a number of take-off distributor conduits.

Figure 1:
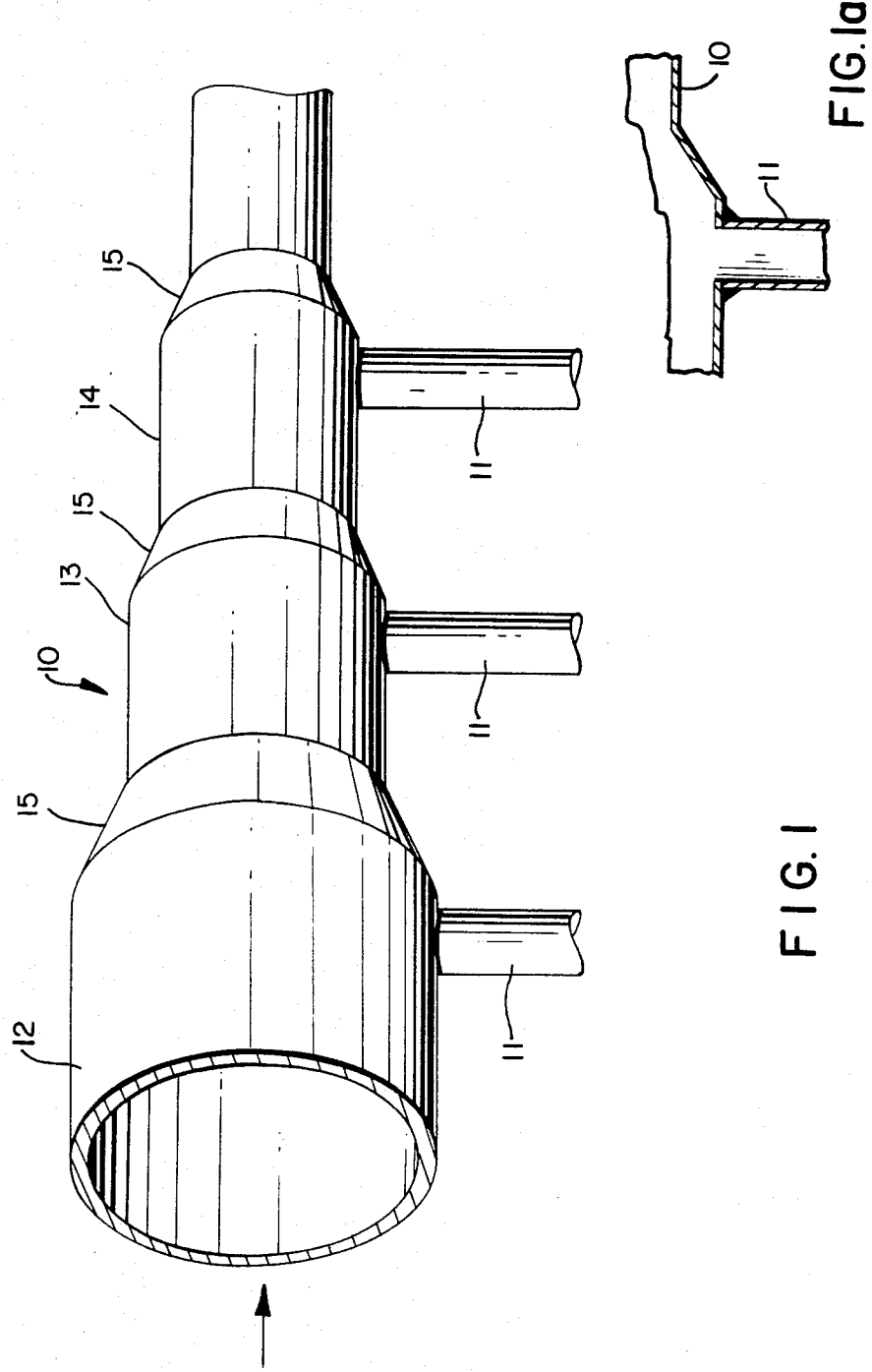
FIG. 1 is a perspective view of the manifold of this invention.

Referring to FIGS. 1 and 1a, a manifold was constructed as shown, because the nature of the sharp-edged take-offs could affect coal distribution due to the turbulence and additional pressure drop generated by the sharp-edges, compared with smooth-edged take-offs.

The manifold 10 of this invention comprises a main conduit 12 and downstream connecting conduit sections 13 and 14, each of successively decreasing diameters. Each conduit is interconnected with its adjacent conduit by a convergent or truncated conical section 15. Immediately upstream of each section 15, a downwardly oriented distributor pipe 11 is attached. Each distributor pipe 11, as seen in FIG. 1a, may be welded to its associated conduit and internally intersects therewith in a sharp edge relationship. As mentioned above, such sharp edge intersection creates a turbulence and associated pressure drop at each take-off point to improve coal particle distribution.

A smooth-edged manifold, initially selected for testing, was constructed of schedule 80 pipe and smooth-radius welding tees to provide a reduction in area from the manifold header diameter to the pass diameter (¾"). Welded reducers were provided downstream of the tee reducing the header diameter to maintain velocity. Spacing between the reducers and tees were developed with approximately 15 inlet diameters spacing before each tee which provides 95% static pressure recovery.

The sharp-edged manifold of FIGS. 1 and 1a was constructed in a manner similar to the smooth-edged manifold, but the smooth radius welding tees were not used. Instead, a ¾-inch pipe nipple was welded onto the header at the take-off location and the take-off was then drilled to a 0.742 I.D. By removing the burrs, a sharp-edged transition from header to pass was provided.

Both the smooth and sharp-edged manifolds were rotated 90° to enable testing with the take-offs on either the side (horizontal) or the bottom (vertical) positions. In the bottom position, gravity forces on particles and slurry particles special distribution were expected to increase the coal concentrations in the take offs nearest the manifold inlet. Therefore, an inertial effect on the particles causing higher coal concentrations in the last take-off from the main header could be directionally reduced by rotating the take-offs from the side to the bottom.

The determination of the concentration of solids flowing in a given pass is based on the weight of the coal trapped, the known densities of the coal and solvent, and the known volume of the sample section.

$$\text{Wt \%} = \frac{100 \times \text{Wgt}_{coal}}{\text{Wgt}_{coal} + \rho_{solv}(\text{Vol} - \text{Wgt}_{coal/pcoal})}$$

The densities of the coal (real density in solution) and solvent as well as the volume of the sample section were determined by laboratory analysis and found highly repeatable.

A concentration maldistribution term for slurry solids weight fraction is defined similarly to the flow maldistribution term used for single-phase manifolds:

$$\text{Normalized Maldistribution Ratio per Pass} = \frac{\text{Wt \% manifold inlet} - \text{Wt \% pass}}{\text{Wt \% manifold inlet}}$$

By this definition, a concentration ratio was calculated for each pass indicating the variance from the inlet to the system. By plotting these for each pass as a function of a flow parameter such as velocity or Reynolds number, a graphical description of slurry distribution was obtained which negates the effect of small differences in inlet concentration between runs. The flow parameter can account for small temperature (hence viscosity) and density variations that occurred in experimental testing. Selecting the slurry Reynolds number as:

$$Re_S = \frac{\rho S V_S d}{\mu_S}$$

Figure 3:
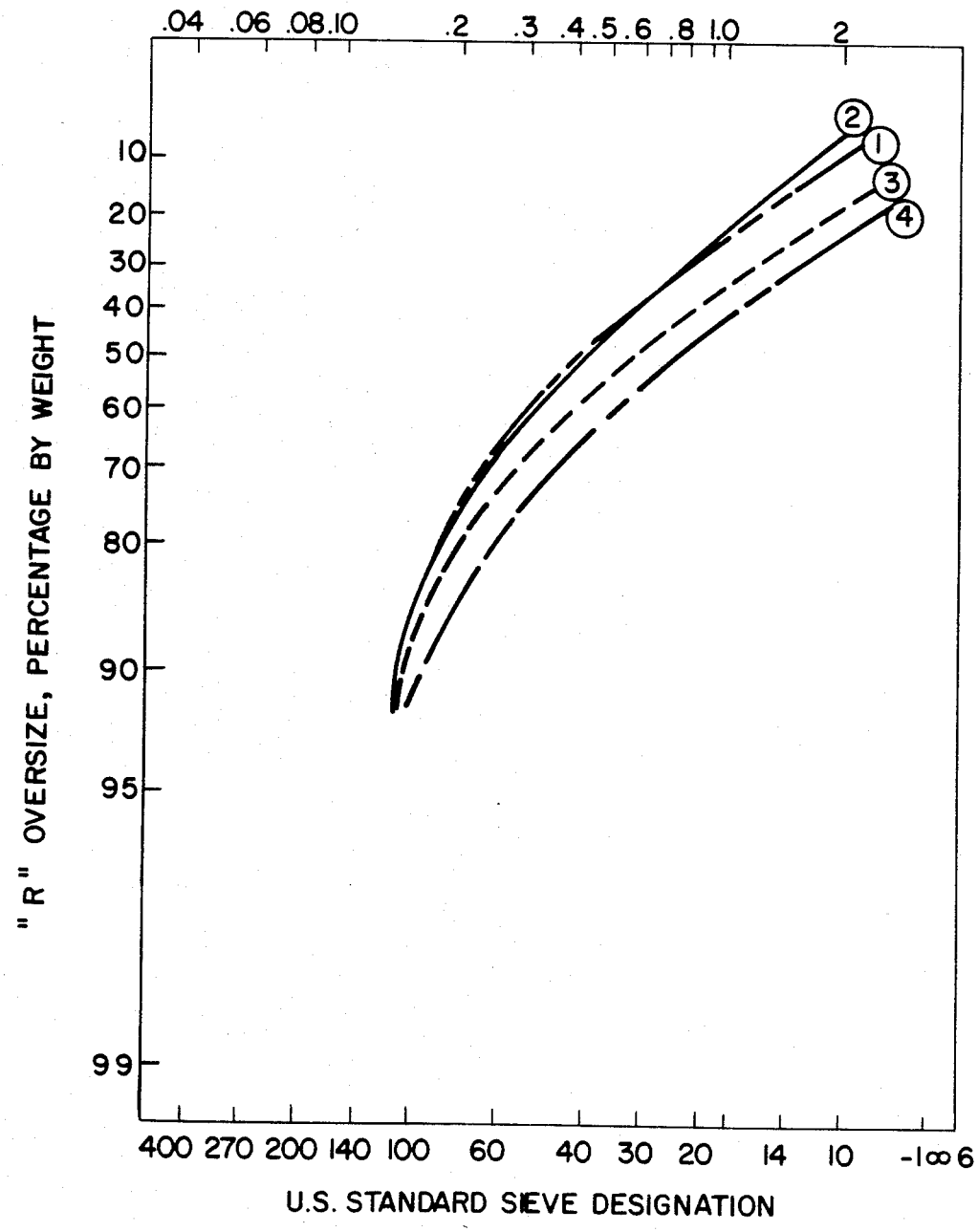
Figure 4:
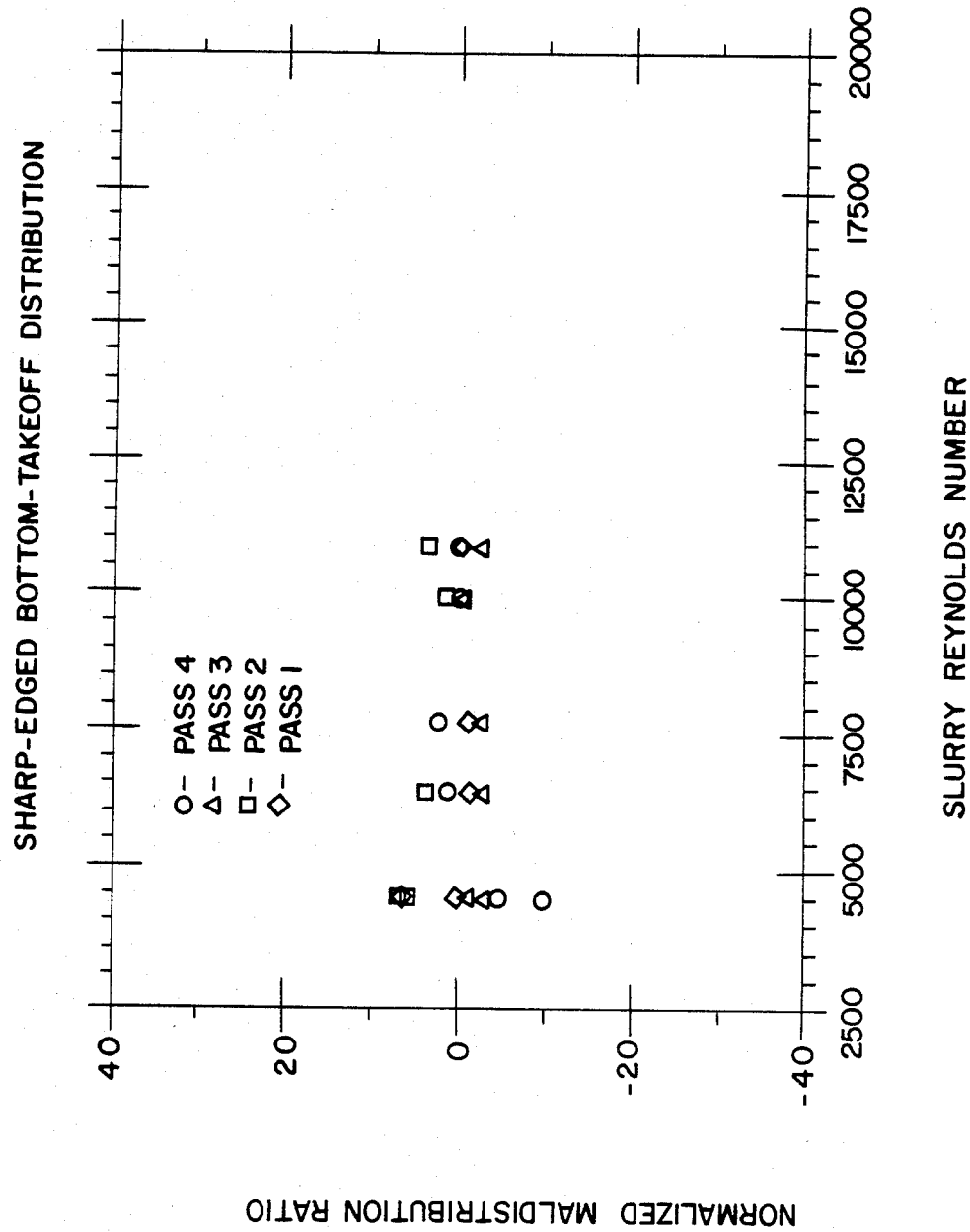
FIGS. 4 and 5 are graphs similar to those of FIGS. 2 and 3, utilizing the sharp-edged bottom take-off of the distributor conduits, as illustrated in the invention of FIG. 1.
Figure 5:
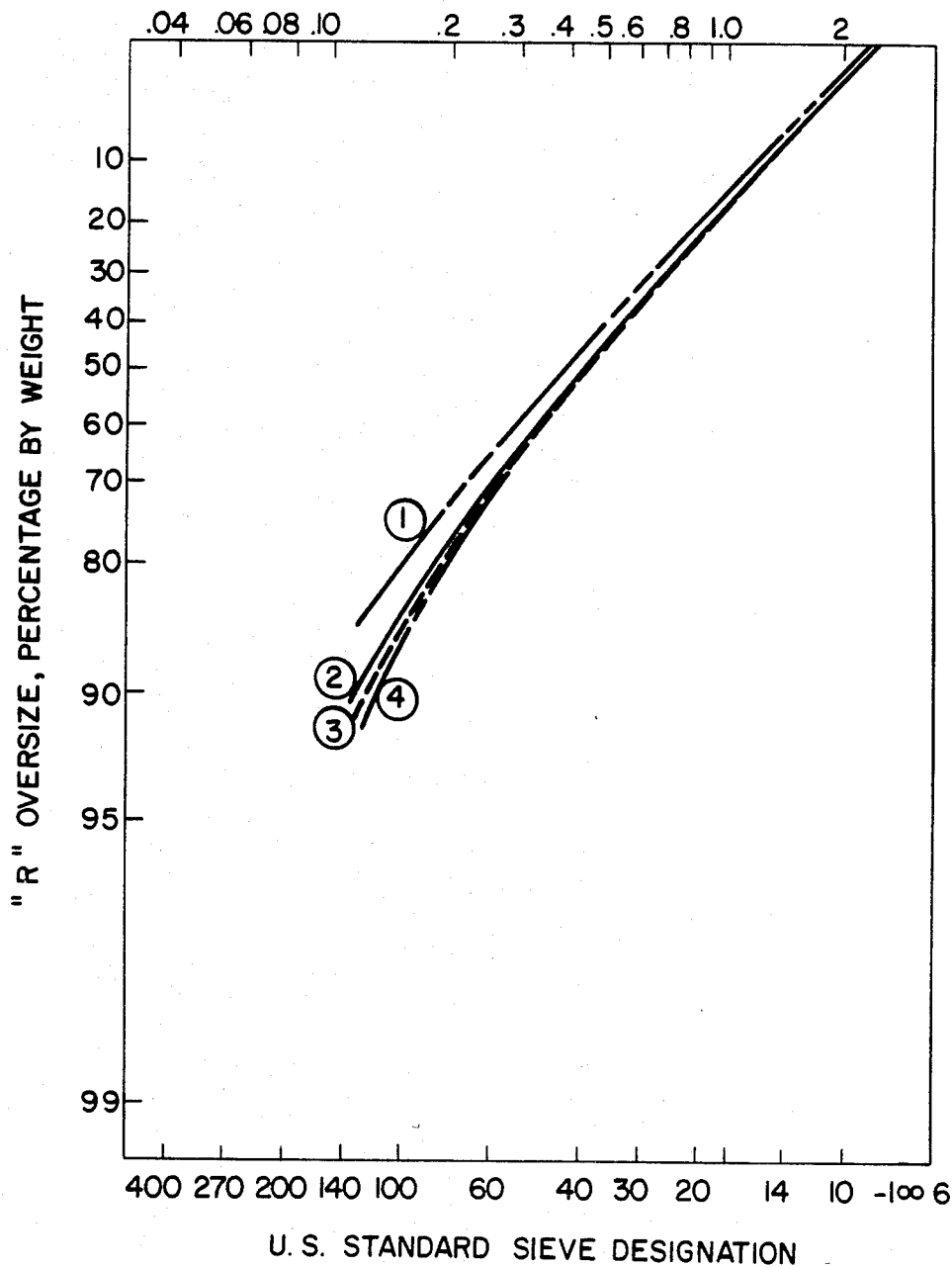

Where:
subscript S denotes average slurry properties
$\rho$ denotes slurry density
V denotes slurry linear velocity
$\mu$ denotes slurry viscosity
d denotes pipe diameter The results of the tests conducted indicate that slurry distribution is a function of slurry flow properties as well as the geometric configuration of the manifold at the take-off point. The concentration and particle size distribution patterns obtained over a wide range of flow conditions with the smooth-edged, side distribution conduits are presented in FIGS. 2 and 3. The improvement of this invention in uniformly distributing the slurry by reorienting the take-offs from the side to the bottom is shown in FIGS. 4 and 5. In general, the manifold configuration of FIGS. 1 and 1a having sharp-edged, bottom take-offs provided the best distribution patterns as shown in Table 1 below:

TABLE I

SLURRY DISTRIBUTION PATTERNS IN HORIZONTAL MANIFOLD[1]

| Take-off Nature | Take-off Orientation | Inlet Coal Concentration (wt %) | Concentration[2] Maldistribution Range (%) | Largest Avg. Particle Size Deviation Between Passes (μm) | Comments |
|---|---|---|---|---|---|
| Side | Smooth | 40 | 10–17 | 330 | Coal concentration is the highest and average particle size largest in the last take-off from the main header. |
|  |  | 27 | 10–22 | 150 |  |
|  |  | 15 | 10–33 | 200 |  |
| Bottom | Smooth | 45 | 5–10 | 210 | Bottom take-offs improve distribution, similar trends as with side take-offs. Saltation velocities should be avoided. |
|  |  | 38 | 4–7 | 160 |  |
| Side | Sharp | 40 | 3–6 | 50 | Sharp edges increase turbulence promoting more even distribution. |
| Bottom | Sharp | 40 | <5 | 50 |  |
|  |  | 45 | <5 | 50 |  |
| Side (close-pass spacing) | Sharp | 40 | 4–6½ | 170 | Closer pass spacing provides less manifold pipe length for flow development. Small increase in maldistribution observed. |

Notes:
[1] Manifold characteristics: S-shaped system; 4 pass manifold; turbulent slurry flow; flow control assured by valves.

[2] Concentration maldistribution = $\frac{\text{wt \% inlet to manifold} - \text{wt \% pass}}{\text{wt \% inlet to manifold}} \times 100$ The range of testing with the smooth-edged, side take-off distributor conduits included inlet slurry concentrations of 15, 27 and 40 weight percent and inlet slurry velocities between 5 and 19 feet per second. In general, coal concentration was found to be the highest in the last take-off from the main header and less in preceding passes. The last pass was also characterized by the largest coal particles with preceding passes having smaller particle size distributions. This is due to the dominance of the inertial forces on the coal particles which result in more coal following the main stream rather than the branch stream at each take-off.

Figure 2:
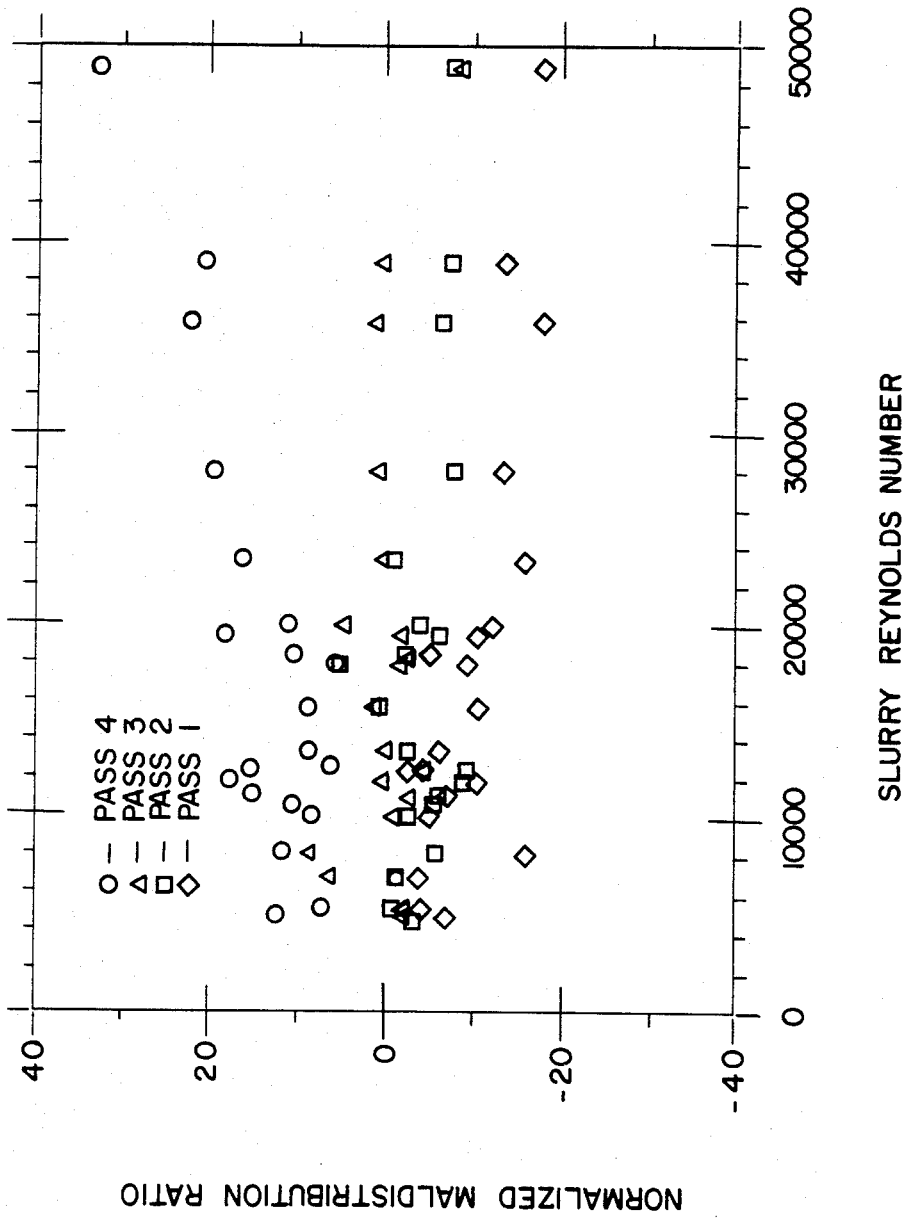
FIGS. 2 and 3 are graphs depicting the maldistribution and particle size of solids with a manifold having smooth-edged side take-off distributor conduits.

Concentration maldistribution, as shown in FIG. 2, defined as the difference between pass concentration and inlet concentration divided by the inlet concentration, was found to decrease as the inlet coal concentration was increased. Thus at a 15 weight percent inlet coal concentration the concentration maldistribution ranged from 10% to 33% while at a 40 weight percent inlet coal concentration, the concentration maldistribution ranged from 10% to 17%. The results of the tests with a 27 weight percent inlet coal concentration fall in between ranging from 10% to 22%. The ranges in concentration maldistribution indicated above are caused by a dependence on the linear slurry velocity in the manifold.

Increasing the linear slurry velocity tends to increase the coal concentration maldistribution at the lower inlet coal concentrations. For example, at 15 and 27 weight percent inlet coal concentrations an increase in slurry velocity from 5 to 18 feet per second produces increases from 10% to 33% and from 10% to 22% in maldistribution. At the higher inlet coal concentration (40 weight percent) this tendency for higher maldistribution at higher velocities was not evidenced. The concentration maldistribution as a function of manifold slurry Reynolds number, shown in FIG. 2, shows a generally increasing maldistribution of concentration with increasing slurry Reynolds number.

Analysis of the particle size distribution of particles found in each pass of the manifold consistently show increasing average particle sizes in successive passes beginning with the first take-off from the main header 12. This is illustrated in FIG. 3, which shows the Rosen Rammler particle size distribution for typical data with the smooth-edged, side take-off manifold. Defining the 50 mass percent cumulative particle size as the average particle size, we can use it as a representative indicator of the relative difference between passes. The maximum difference in average particle sizes between passes was found to be 330 microns with the 40 weight percent inlet slurry concentration, 150 microns with the 27 weight percent slurry and 200 microns with the 15 weight percent slurry. Thus there appears to be no direct relation between particle size differences between passes and inlet coal concentration. In addition, the particle size maldistribution did not exhibit a direct response to slurry velocity.

The slurry distribution patterns found in this smooth-edged, side take-off manifold configuration appear to be dominated by the inertial forces on the coal particles. Thus a disproportionate number of coal particles approaching take-off tend to follow a linear path, remaining with the main flow, and separating from their liquid portion which flows into the distributor branch 11. This creates the increasing pass slurry concentration trend with manifold length. The observation that the last take-off has larger particles would be expected because of their higher inertia; however, since average particle size deviations between passes do not correlate with velocity, the distribution patterns are produced from a more complex interaction of inertial, frictional and settling forces.

An improvement in slurry distribution was achieved by rotating the side take-off to the bottom position, as illustrated in FIG. 1. In this orientation, gravity forces on the coal particles encourage a more even distribution by increasing the concentrations of coal in the passes nearer to the manifold inlet. In addition, the density gradient of particles in slurry flow at the entrance to the take-off are skewed toward the bottom of the pipe and produce a higher coal concentration in the proximity of the branch 11. In general, the results indicate that the slurry distribution patterns obtained with the bottom take-offs are improved but are similar in trends to the patterns found with side take-offs. Coal concentration was the highest and average particle size the largest in the last take-off from the main header. Significant improvements in concentration maldistribution were obtained as shown in FIG. 4. However, only a slight improvement in particle size distribution was observed, as depicted in FIG. 5.

Having thus described the invention, what is desired to be protected by Letters Patent is presented in the appended claims.

What is claimed is:

1. The method of uniformly dividing a coal-liquid hydrocarbon slurry stream including coal particles of different size ranges mixed and suspended in said liquid flowing in a main conduit into smaller, but substantially equal, slurry side streams of uniform coal particle size distribution flowing in a plurality of distributor conduits fed from said main conduit, comprising the steps of progressively decreasing the diameter of said main conduit to maintain substantially equal slurry flow velocity throughout the length of said main conduit as said side streams are withdrawn, locating a plurality of distributor conduits immediately adjacent and upstream of each said main conduit progressive diameter decreases, and creating turbulence and an associated pressure drop in the main conduit adjacent a sharp edge terminal end portion of each of said distributor conduits at their respective points of communication with the interior of said main conduit whereby improved and substantially uniform coal particle size distribution will result in each of said distributor conduits.

2. The method of claim 1 including the further step of orienting said distributor conduits in a substantially vertical and downward direction from a substantially horizontal main conduit.

* * * * *